US009668603B2

United States Patent
Barkhouse

(10) Patent No.: US 9,668,603 B2
(45) Date of Patent: Jun. 6, 2017

(54) SYSTEMS, METHODS AND DEVICES FOR REMOTE FUEL LEVEL DETECTION

(71) Applicant: Sydney Barkhouse, Oakville (CA)

(72) Inventor: Sydney Barkhouse, Oakville (CA)

(73) Assignee: TITANFIRE, INC., Oakville, Ontario (CA)

(*) Notice: Subject to any disclaimer, the term of this patent is extended or adjusted under 35 U.S.C. 154(b) by 397 days.

(21) Appl. No.: 14/057,801

(22) Filed: Oct. 18, 2013

(65) Prior Publication Data

US 2014/0113039 A1  Apr. 24, 2014

Related U.S. Application Data

(60) Provisional application No. 61/715,636, filed on Oct. 18, 2012.

(51) Int. Cl.
  G01F 23/20 (2006.01)
  A47J 27/62 (2006.01)
  A47J 37/07 (2006.01)
(52) U.S. Cl.
  CPC ........... *A47J 27/62* (2013.01); *A47J 37/0786* (2013.01); *G01F 23/20* (2013.01)
(58) Field of Classification Search
  CPC ........ A47J 27/62; A47J 37/0786; G01F 23/20
  USPC .......................................................... 73/296
  See application file for complete search history.

(56) References Cited

U.S. PATENT DOCUMENTS

| 6,949,729 | B1* | 9/2005 | Ishikawa | H05B 6/688 |
| | | | | 219/702 |
| D594,276 | S | 6/2009 | Hamlin | |
| D604,098 | S | 11/2009 | Hamlin | |
| 2007/0163568 | A1* | 7/2007 | Murray | A47J 37/0713 |
| | | | | 126/50 |

(Continued)

OTHER PUBLICATIONS iDevices, LLC, http://idevicesinc.com/igrill/, 2013.

*Primary Examiner* — John Fitzgerald
*Assistant Examiner* — Rodney T Frank
(74) *Attorney, Agent, or Firm* — Norton Rose Fulbright Canada LLP; Maya Medeiros

(57) ABSTRACT

Embodiments described herein relate to systems, methods, and devices for remote fuel level detection. A weighing instrument may couple to a propane tank for determining measurement values for a weight of the propane tank, wherein the propane tank is for coupling to a cooking apparatus to provide the fuel to the cooking apparatus. A computing device may receive, via a wireless communication link, measurement values for the weight of the propane tank; correlate the measurement values to data values stored in a database to determine an amount of fuel in the propane tank; and provide the amount of fuel in the propane tank to a user interface. A temperature instrument may determine a temperature of a region proximate to the propane tank to generate a safety factor for the propane tank. A temperature instrument may determine temperatures for regions proximate to the cooking apparatus. A temperature control may control the cooking apparatus. A temperature instrument may determine temperatures for food items cooking on the cooking apparatus, wherein the temperature instrument comprises a plurality of probes, each probe coupled to a food item cooking on the cooking apparatus. Other variations are described.

12 Claims, 20 Drawing Sheets

(56) References Cited

U.S. PATENT DOCUMENTS

| | | | | |
|---|---|---|---|---|
| 2009/0126714 A1* | 5/2009 | Barkhouse | ............. | F23N 1/002 |
| | | | | 126/39 G |
| 2009/0183729 A1* | 7/2009 | Barkhouse | ............. | A47J 27/62 |
| | | | | 126/39 BA |
| 2011/0029262 A1* | 2/2011 | Barkhouse | ............. | G01F 23/00 |
| | | | | 702/55 |
| 2011/0269085 A1* | 11/2011 | Wiker | .............. | A21B 1/48 |
| | | | | 432/4 |
| 2013/0206015 A1* | 8/2013 | Jacoby | ................ | A47J 37/07 |
| | | | | 99/330 |

* cited by examiner

Figure 20

SYSTEMS, METHODS AND DEVICES FOR REMOTE FUEL LEVEL DETECTION

CROSS REFERENCE TO RELATED APPLICATION

This application claims priority to U.S. Provisional Application No. 61/715,636 filed on Oct. 18, 2012, the entire contents of which is hereby incorporated by reference.

FIELD

Embodiments described herein relate to systems, methods and devices for remote fuel level detection, and in particular, embodiments described herein relate to systems, methods and devices for remote fuel level detection of a propane tank providing fuel to a cooking apparatus.

INTRODUCTION

A cooking apparatus such as an outdoor barbeque may receive fuel from a propane tank coupled thereto. It may be difficult to determine how much fuel is in the fuel tank and how long the propane tank may provide fuel for the cooking apparatus. The fuel may run out when food items on the cooking apparatus are only partially cooked. This may result in inconvenience for the user. Further, safety issues may result from high temperatures proximate to the fuel tank.

Cooking food items on a cooking apparatus may require constant attention by a user which may be inconvenient and time consuming.

There exists a need for systems, methods, and devices for remote fuel level detection for, e.g. a propane tank providing fuel to a cooking apparatus, remote temperature monitoring, remote control, or a combination thereof, or at least alternatives.

SUMMARY

In a first aspect, embodiments described herein may relate to a system for remote fuel level detection comprising: a weighing instrument for coupling to a propane tank for determining measurement values for a weight of the propane tank, wherein the propane tank is for coupling to a cooking apparatus to provide the fuel to the cooking apparatus; a computing device comprising at least one processor and at least one memory storing executable instructions to configure the at least one processor to: receive, via a wireless communication link, the measurement values for the weight of the propane tank; correlate the measurement values to data values stored in a database to determine an amount of fuel in the propane tank; and provide the amount of fuel in the propane tank to a user interface, wherein the user interface provides an indication of the amount of fuel in the propane tank.

In accordance with some embodiments, the system may further comprise: a temperature instrument for determining a temperature of a region proximate to the propane tank; wherein the processor of the computing device is further configured to: receive, via a wireless communication link from the temperature instrument, the temperature of the region proximate to the propane tank; correlate the temperature of the region proximate to the propane tank to safety threshold data values stored in a database to generate a safety data value; provide the safety data value to the user interface, wherein the user interface provides an indication of the safety data value for the propane tank.

In accordance with some embodiments, the system may further comprise: a temperature instrument for determining a plurality of temperatures for a corresponding plurality of regions proximate to the cooking apparatus; wherein the processor of the computing device is further configured to: receive, via a wireless communication link from the temperature instrument, the plurality of temperatures for the corresponding plurality of regions proximate to the cooking apparatus; correlate the plurality of temperatures for the corresponding plurality of regions proximate to the cooking apparatus to a corresponding plurality of food items cooking on the cooking apparatus to generate a cooking factor for each of the plurality of food items; provide the cooking factors to the user interface, wherein the user interface provides an indication of the cooking factors for the plurality of food items cooking on the cooking apparatus.

In accordance with some embodiments, the system may further comprise: a temperature control for controlling the cooking apparatus in response to control signals received from the computing device via the wireless communication link.

In accordance with some embodiments, the system may further comprise: a temperature instrument for determining a plurality of temperatures for a corresponding plurality food items cooking on the cooking apparatus, wherein the temperature instrument comprises a plurality of probes, each probe coupled to a food item of the plurality food items cooking on the cooking apparatus; wherein the processor of the computing device is further configured to: receive, via a wireless communication link from the temperature instrument, the plurality of temperatures for the plurality food items cooking on the cooking apparatus; correlate the plurality of temperatures for the plurality food items cooking on the cooking apparatus to a corresponding plurality of cooking factors for each of the plurality of food items; provide the cooking factors to the user interface, wherein the user interface provides an indication of the cooking factors for the plurality of food items cooking on the cooking apparatus.

In accordance with some embodiments, the processor of the computing device is further configured to determine a time value using the amount of fuel in the propane tank, wherein the time value provides an estimate of how long the propane tank can provide fuel to the cooking apparatus.

In accordance with some embodiments, the system may further comprise: a grill plate coupled to a thermocouple to determine a temperature for the grill plate; wherein the processor of the computing device is further configured to: receive, via a wireless communication link, the temperature for the grill plate; correlate the temperature for the grill plate to data values stored in a database to generate a cooking factor for the grill plate; provide the cooking factor for the grill plate to the user interface, wherein the user interface provides an indication of the cooking factors for the grill plate.

In accordance with some embodiments, the wireless communication link comprises a Bluetooth communication link.

In another aspect embodiments described herein may relate to a system for remote fuel level detection comprising: a weighing instrument for determining measurement values for a weight of one or more objects; a computing device comprising at least one processor and at least one memory storing executable instructions to configure the at least one processor to: receive, via a wireless communication link from the weighing instrument, the measurement values for the weight of the one or more objects; correlate the measurement values to data values stored in a database to generate output data values; and provide the output data values to a user interface, wherein the user interface provides an indication of the output data values.

In accordance with some embodiments, the system may further comprise: a temperature instrument for determining a temperature of the one or more food items; wherein the processor of the computing device is further configured to: receive, via a wireless communication link from the temperature instrument, the temperature of the one or more food items; correlate the temperature of the one or more food items to cooking threshold data values stored in a database to generate a cooking factor for the one or more food items; provide the cooking factor to the user interface, wherein the user interface provides an indication of the cooking factor for the one or more food items.

In accordance with some embodiments, the weighing instrument comprises a kitchen scale and the one or more objects correspond to food items, wherein the output data values correspond to a weight of the food items.

In accordance with some embodiments, the processor of the computing device is further configured to provide a video cooking demonstration for the one or more food items.

In accordance with some embodiments, the data values stored in the database correspond to data values for a cooking recipe listing a plurality of ingredients and a corresponding plurality of weight measurements, wherein the one or more objects correspond to an ingredient of the plurality of ingredients, and wherein the processor of the computing device is further configured to adjust the corresponding plurality of weight measurements based on the measurements values for the ingredient, and wherein the output data values provide an indication of the adjusted corresponding plurality of weight measurements.

In a further aspect embodiments described herein may provide a method for remote fuel level detection comprising: providing a weighing instrument for coupling to a propane tank, wherein the propane tank is for coupling to a cooking apparatus to provide the fuel to the cooking apparatus; determining measurement values for a weight of the propane tank using the weighing instrument; providing executable instructions to a computing device comprising at least one processor and at least one memory storing the executable instructions to configure the at least one processor; receiving, via a wireless communication link at the computing device, the measurement values for the weight of the propane tank; correlating, at the computing device, the measurement values to data values stored in a database to determine an amount of fuel in the propane tank; and providing the amount of fuel in the propane tank to a user interface, wherein the user interface provides an indication of the amount of fuel in the propane tank.

In accordance with some embodiments, the method may further comprise: providing a temperature instrument for determining a temperature of a region proximate to the propane tank; receiving, at the computing device via a wireless communication link from the temperature instrument, the temperature of the region proximate to the propane tank; correlating, using the computing device, the temperature of the region proximate to the propane tank to safety threshold data values stored in a database to generate a safety data value; providing the safety data value to the user interface, wherein the user interface provides an indication of the safety data value for the propane tank.

In accordance with some embodiments, the method may further comprise: providing a temperature instrument for determining a plurality of temperatures for a corresponding plurality of regions proximate to the cooking apparatus; receiving, at the computing device via a wireless communication link from the temperature instrument, the plurality of temperatures for the corresponding plurality of regions proximate to the cooking apparatus; correlating, using the computing device, the plurality of temperatures for the corresponding plurality of regions proximate to the cooking apparatus to a corresponding plurality of food items cooking on the cooking apparatus to generate a cooking factor for each of the plurality of food items; providing the cooking factors to the user interface, wherein the user interface provides an indication of the cooking factors for the plurality of food items cooking on the cooking apparatus.

In accordance with some embodiments, the method may further comprise: providing a temperature control for controlling the cooking apparatus in response to control signals received from the computing device via the wireless communication link.

In accordance with some embodiments, the method may further comprise: providing a temperature instrument for determining a plurality of temperatures for a corresponding plurality food items cooking on the cooking apparatus, wherein the temperature instrument comprises a plurality of probes, each probe coupled to a food item of the plurality food items cooking on the cooking apparatus; receiving, at the computing device via a wireless communication link from the temperature instrument, the plurality of temperatures for the plurality food items cooking on the cooking apparatus; correlating, using the computing device, the plurality of temperatures for the plurality food items cooking on the cooking apparatus to a corresponding plurality of cooking factors for each of the plurality of food items; providing the cooking factors to the user interface, wherein the user interface provides an indication of the cooking factors for the plurality of food items cooking on the cooking apparatus.

In accordance with some embodiments, the method may further comprise: determining a time value using the amount of fuel in the propane tank, wherein the time value provides an estimate of how long the propane tank can provide fuel to the cooking apparatus.

In accordance with some embodiments, the method may further comprise: providing a grill plate coupled to a thermocouple to determine a temperature for the grill plate; receiving, at the computing device via a wireless communication link, the temperature for the grill plate; correlating, using the computing device, the temperature for the grill plate to data values stored in a database to generate a cooking factor for the grill plate; providing the cooking factor for the grill plate to the user interface, wherein the user interface provides an indication of the cooking factors for the grill plate.

Other variations, modifications and embodiments are described herein.

DRAWINGS

Various embodiments will now be described, by way of example only, with reference to the following drawings, in which:

FIGS. 19 and 20 illustrates a schematic diagram and table for an electronic layout of a fuel level detection and temperature device according to embodiments described herein.

Figure 1:
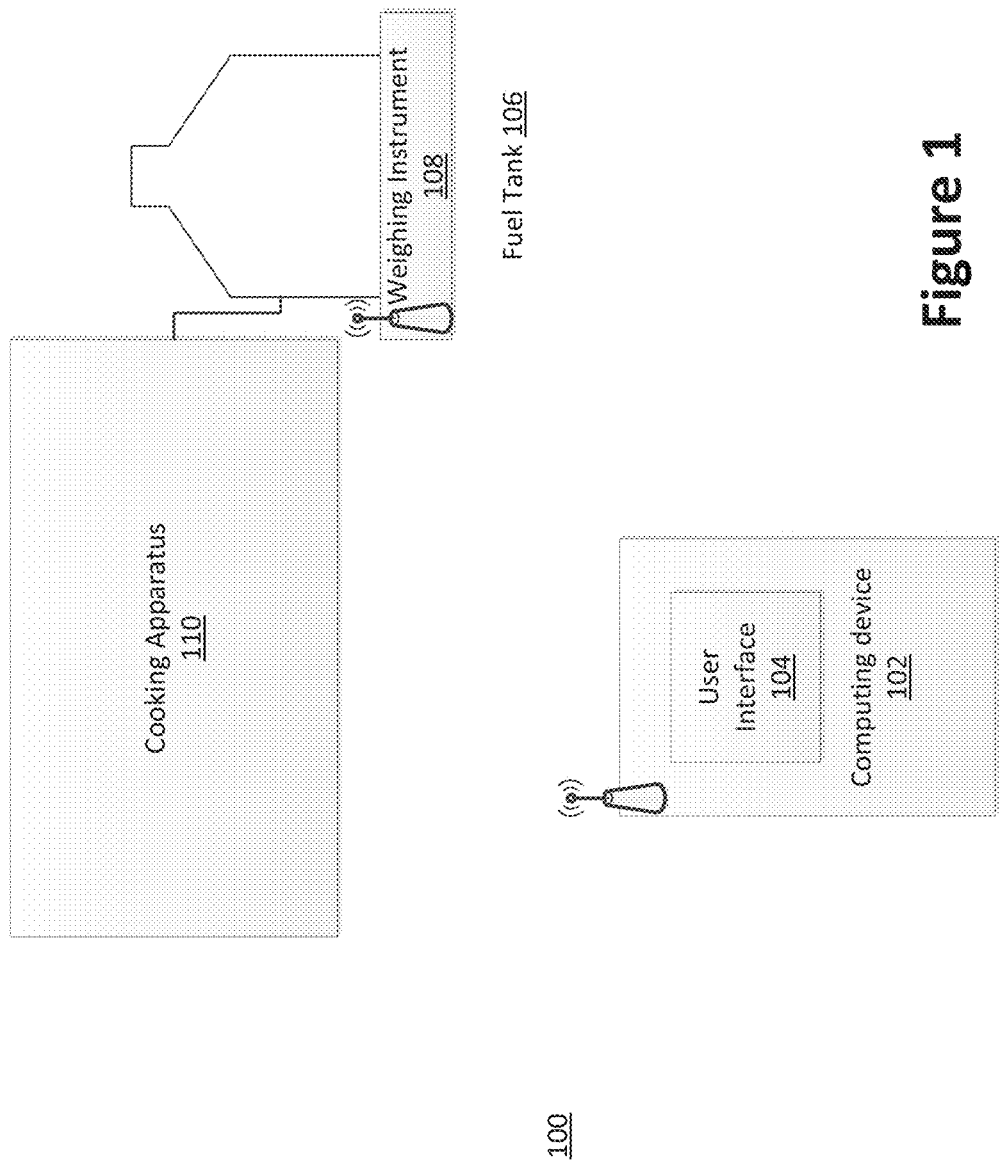
FIG. 1 illustrates a schematic diagram of a system for remote fuel level detection according to embodiments described herein.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

DESCRIPTION OF VARIOUS EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may provide remote fuel level detection, remote temperate measurements and remote control of devices to facilitate cooking and other applications.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FIG. 1 illustrates a schematic diagram of a system 100 for remote fuel level detection according to embodiments described herein.

System 100 may include a weighing instrument 108 for coupling to a fuel tank 106 (e.g. a propane tank) for determining measurement values for a weight of the propane tank. The fuel tank 106 couples to a cooking apparatus 110 to provide the fuel to the cooking apparatus 110. For example, the cooking apparatus 110 may be an outdoor barbeque and the propane may be used to provide fuel for flames to heat the grill and cavity of the barbeque. The cooking apparatus 110 may be an outdoor smoker, an indoor range, or other cooking appliance. The cooking apparatus 110 may be an appliance such as turkey fryers, where a temperature instruction with probes can measure oil temperatures and provide appropriate warnings and functionality.

The fuel tank 106 may be a propane tank (household, RV), industrial or commercial tank, and so on. 12. RV or commercial systems may have multiple tanks 106 that are coupled together to provide maximum time. One or more weighing instruments 108 may be coupled to the multiple tanks 106. Although only one fuel tank 106 is shown for simplicity there may be multiple fuel tanks, each coupled to one or more weighing instruments 108. For example, one or more weighing instruments 108 may measure multiple propane cylinders in a specific location (restaurants, commercial applications, forklift, special gases, etc.). That is, a weighing instrument 108 may couple to multiple fuel tanks 106, or there may be one weighing instrument 108 per fuel tank 106, or a combination thereof. 13. Embodiment could also be used for remote idling of trucks to give indication of propane remaining and temperature concerns.

Figure 6:
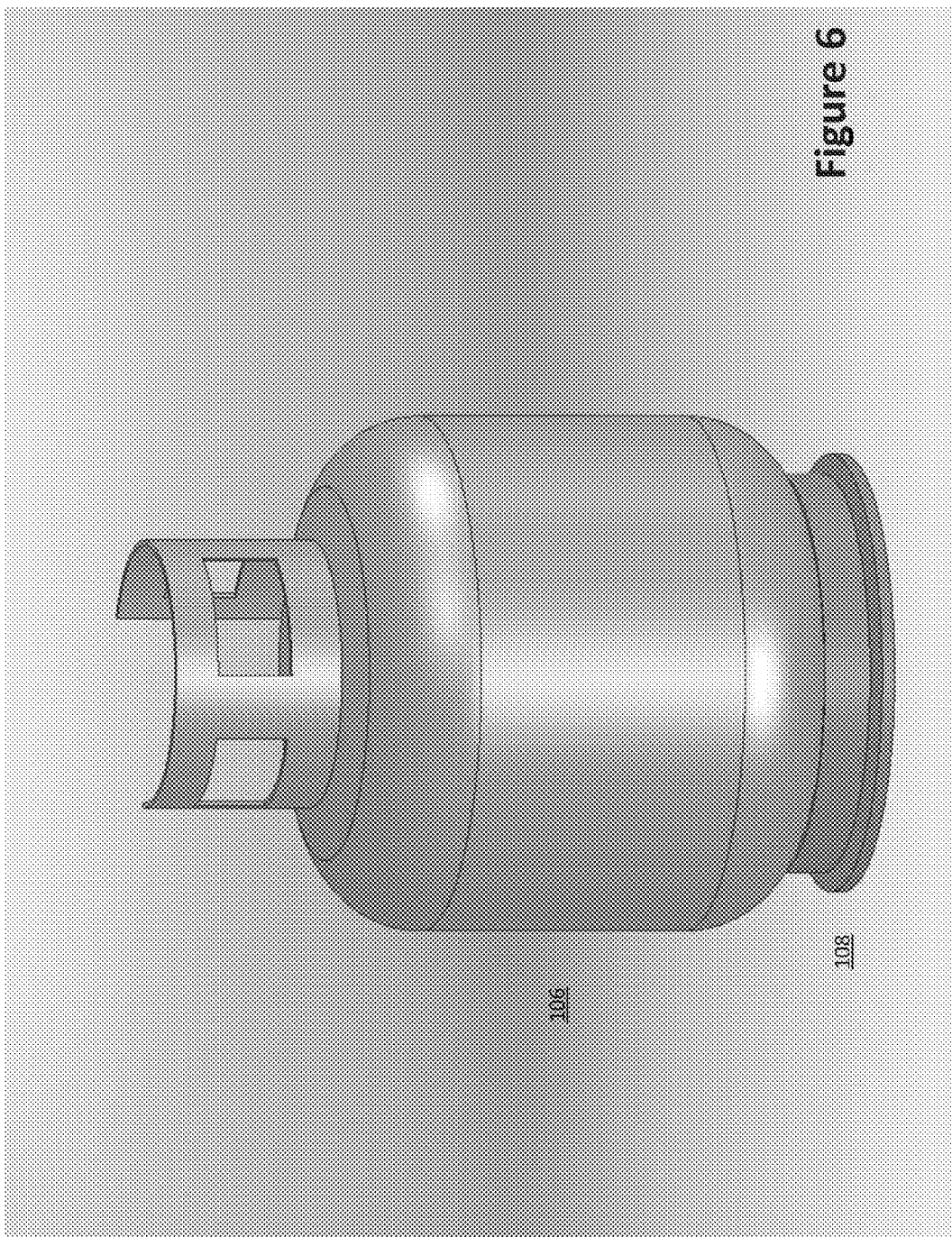
FIG. 6 illustrates a schematic diagram of a propane tank and weighing instrument according to embodiments described herein.
Figure 7:
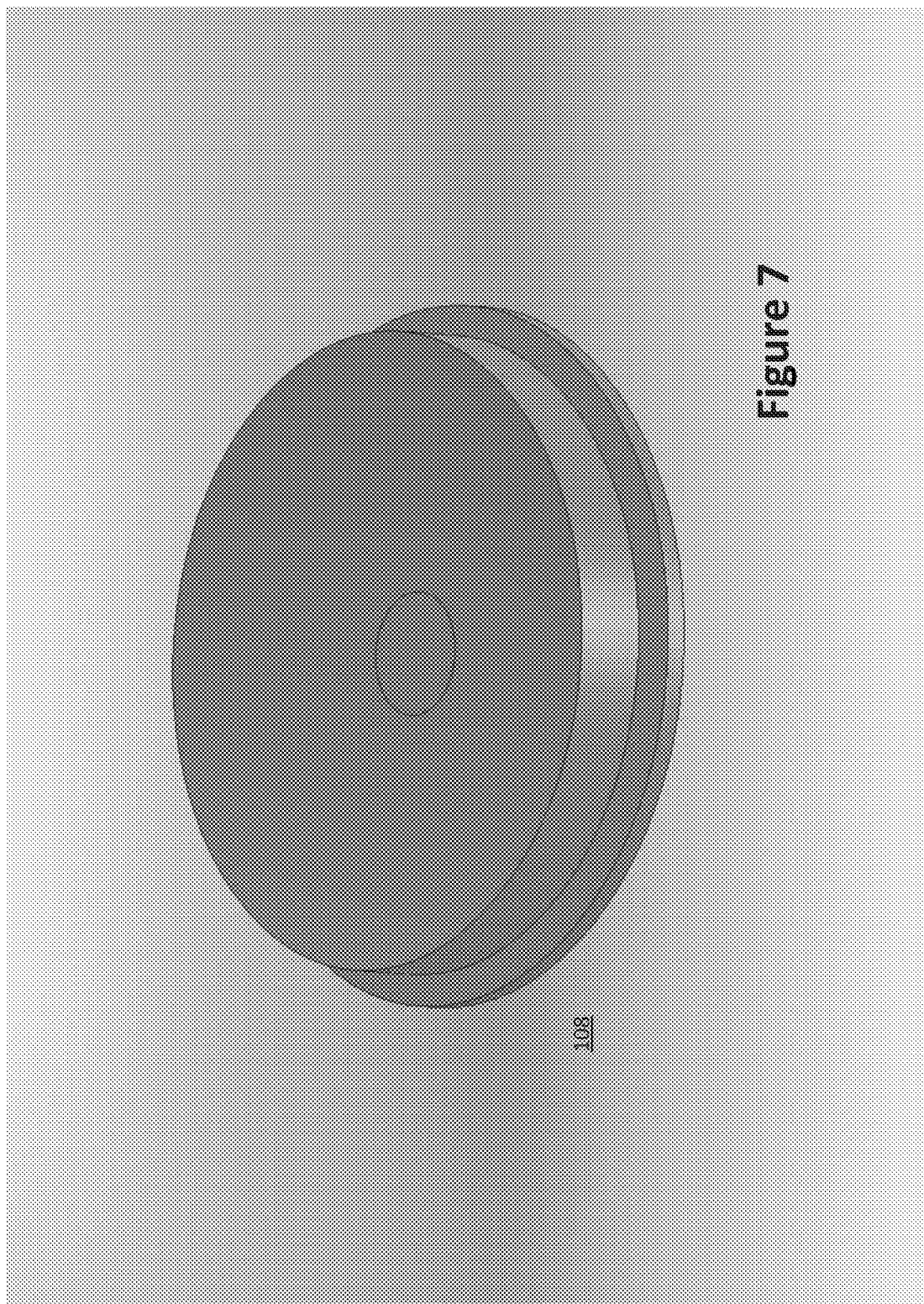
FIG. 7 illustrates a schematic diagram of a weighing instrument according to embodiments described herein.
Figure 8:
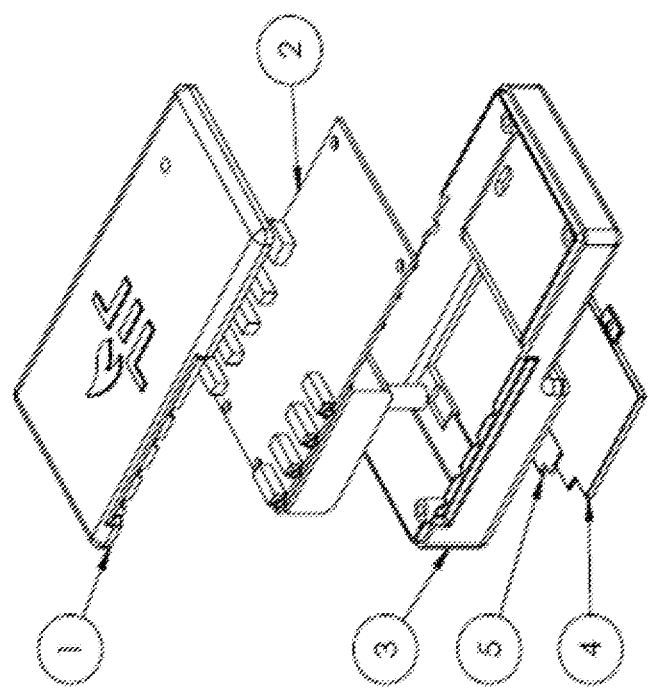
FIGS. 8 to 13 illustrates a schematic diagram of different views of a temperature device according to embodiments described herein.
Figure 9:
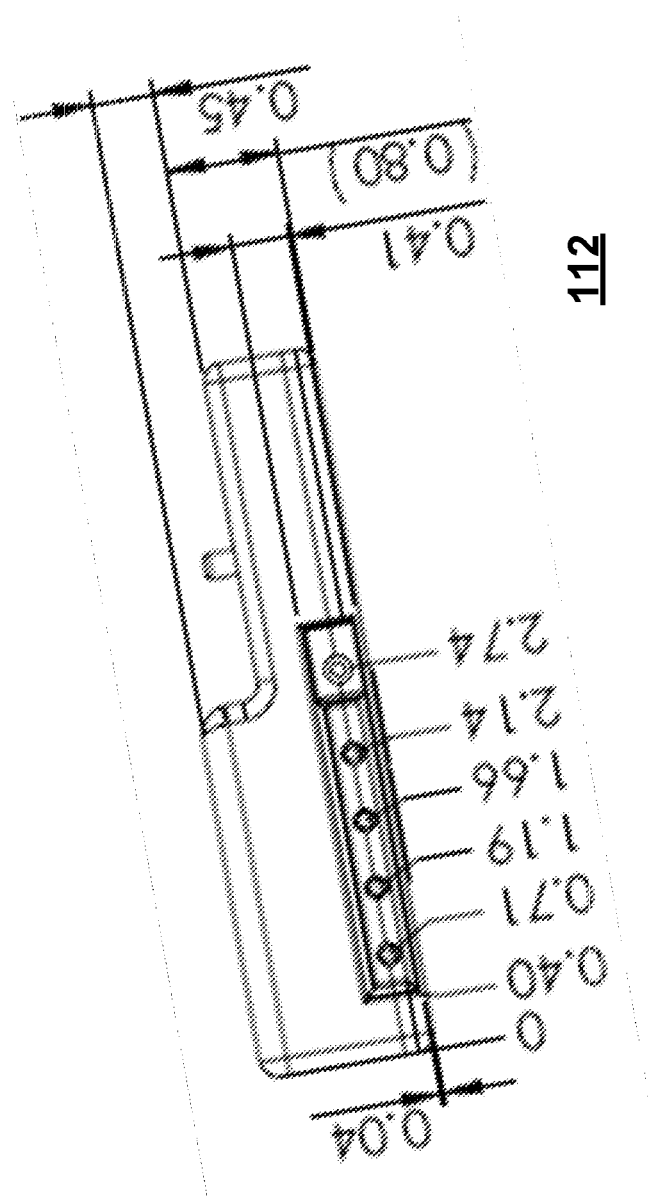
Figure 10:
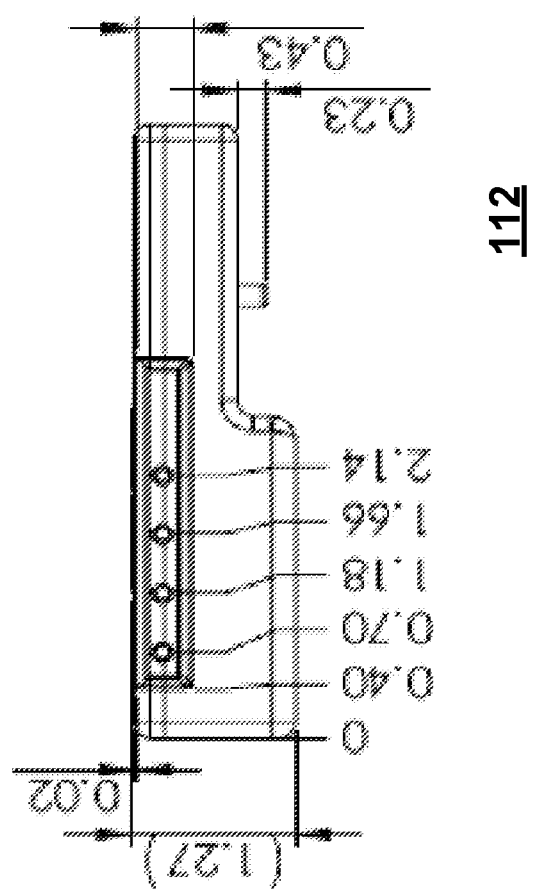
Figure 11:
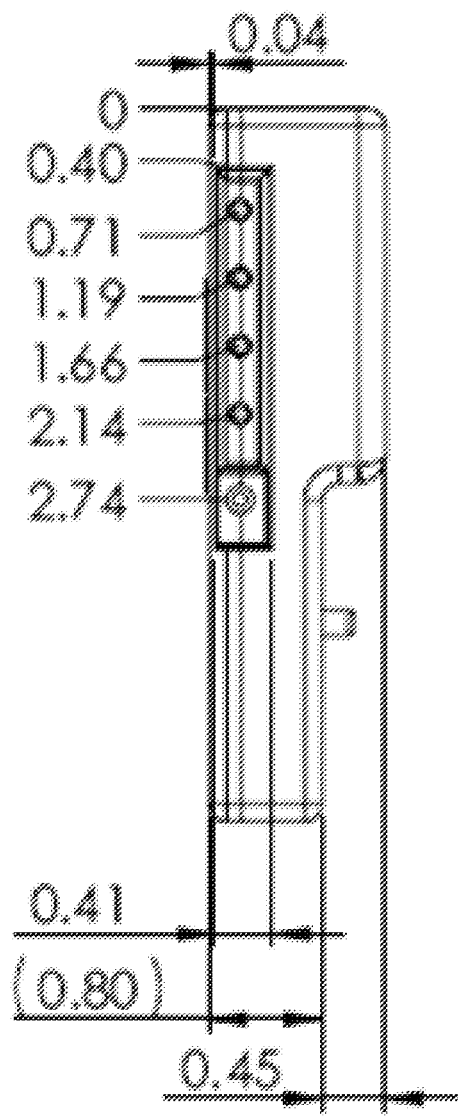
Figure 12:
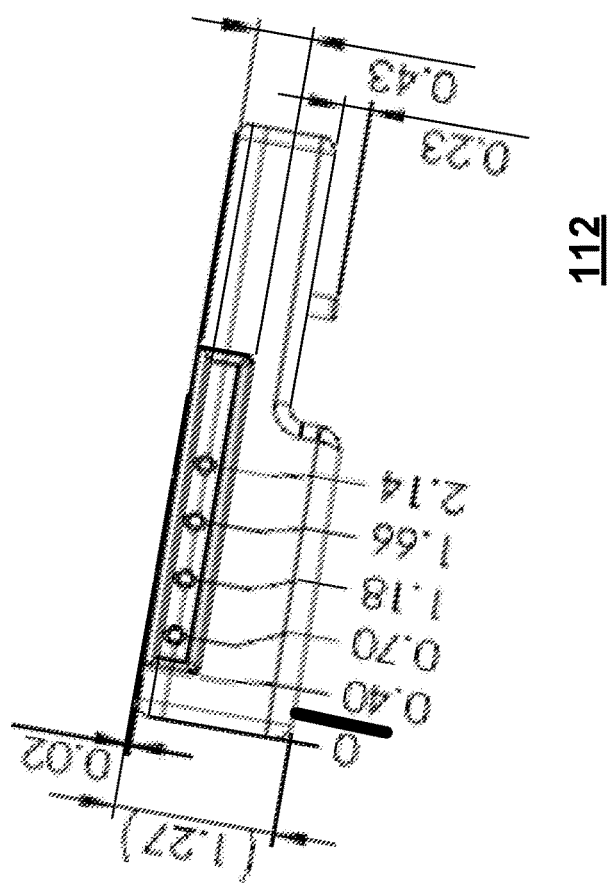
Figure 13:
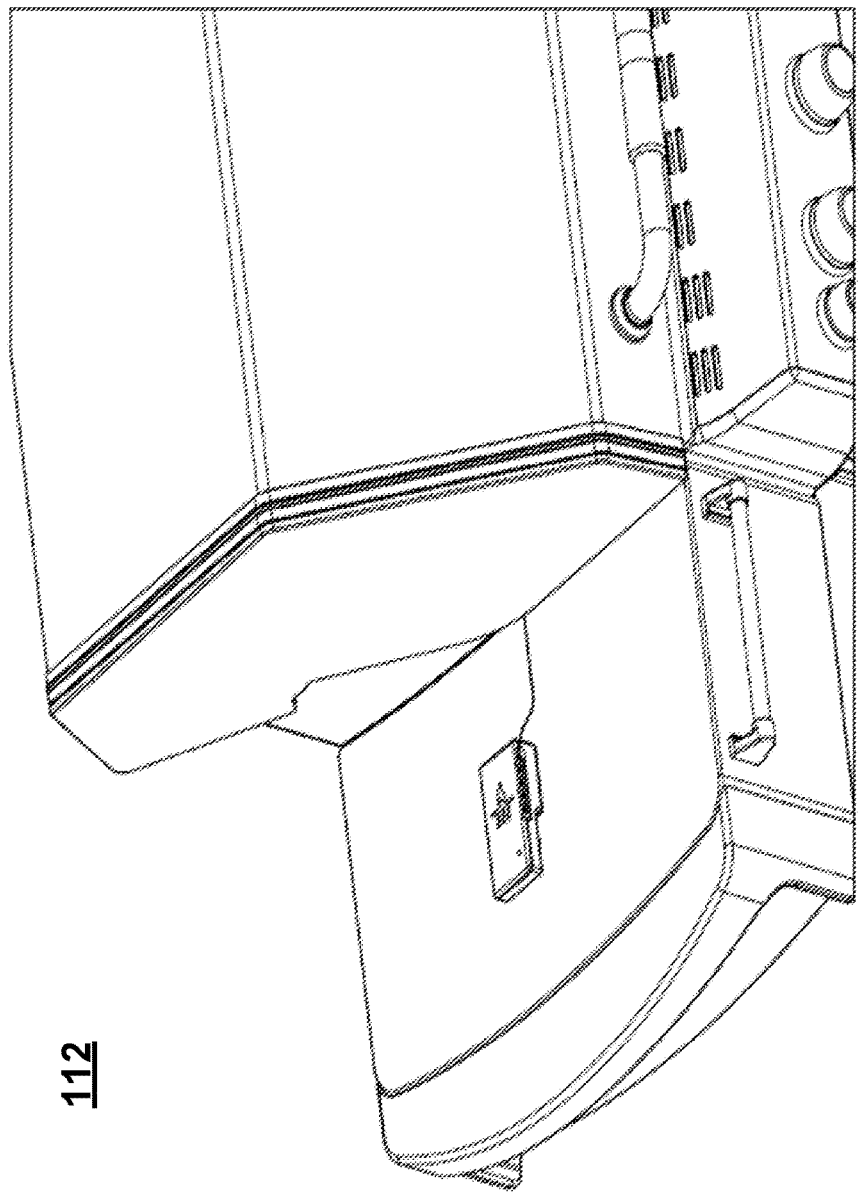

FIG. 6 illustrates a schematic diagram of a fuel tank 106 and weighing instrument 108 according to embodiments described herein. FIG. 7 illustrates a schematic diagram of a weighing instrument 108 according to embodiments described herein. In this example, the weighing instrument 108 may positioned on the bottom of the fuel tank 106 to support the weight of the fuel tank 106. The weighing instrument 108 may have two pieces, a concave cradle shaped to receive the fuel tank 106 bottom which moves with the weight of the fuel tank 106, and a stationary part of the weigh scale. The weighing instrument 108 may include load cells or other weighing mechanism. This is an example scale only and the tank scales feature may be designed to allow for alternate containers and be configured for other gas mixes. Propane is an example only.

System 100 may include a computing device 102 comprising at least one processor and at least one memory storing executable instructions to configure the at least one processor.

Computing device 102 may be any networked computing device including a processor and memory, such as a personal computer, workstation, server, portable computer, mobile phone, personal digital assistant, laptop, smart phone, satellite phone, WAP phone, wearable device (e.g. smart watch), embedded device or system or a combination of these. Computing device 102 may include or have access to a software application, application plug-in (e.g. a widget), instant messaging application, mobile device application, e-mail application, online telephony application, java application, web page, or web object (e.g. a widget) residing or rendered on computing device 102 in order to access other components of the system 100.

For simplicity only one computing device 102 is shown but system 100 may include one or more computing devices 102 operable by users to access remote network resources and components. The computing devices 102 may be the same or different types of devices. The computing device 102 may be implemented using one or more processors and one or more data storage devices configured with database(s) or file system(s), or using multiple devices or groups of storage devices distributed over a wide geographic area and connected via a network (which may be referred to as "cloud computing").

Computing device 102 may reside on any networked computing device, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

Computing device 102 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computing device 101 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device 102 may include one or more input devices, such as a keyboard, mouse, camera, touch screen and a microphone, and may also include one or more output devices such as a display screen and a speaker. Computing device 102 has a network interface in order to communicate with other components, to access and connect to network resources, to serve an application and other applications, and perform other computing applications by connecting to a network (or multiple networks) capable of carrying data including the Bluetooth, Zigbee, Atmel, STM, TI, Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more computing device 102 distributed over a geographic area and connected via a network. Computing device 102 is operable to register and authenticate users (using a login, unique identifier, and password for example) prior to providing access to applications, a local network, network resources, other networks and network security devices. Computing devices 102 may be different types of devices and may serve one user or multiple users.

Computing device 102 may include control logic to configure the processor to receive, via a wireless communication link, measurement values for the weight of the propane tank. The wireless communication link may be implemented using Bluetooth, Zigbee, Atmel, STM, TI, Wi-Fi, LE Bluetooth, or other wireless protocol or mechanism. Computing device 102 may be configured to access a database of rich information relating to the measurement values. For example, the database may contain fuel level related data values to enable computing device 102 to process the measurement values. For example, the database may include average weights for a variety of different propane tanks when they are empty, full, partially full and so on. These values may be used as defaults. Additional values may be configured by user for a particular tank. For example, the user may measure their tank 106 when empty and input that value into database via computing device 102. The database may also include data values for calories and nutritional information for food. The database may further include data values for recipes, including listings of ingredients and corresponding quantities (in weight measurements) for the ingredients. The database may reside on a data storage device or computer hardware memory. User configured values may be associated with a user identifier to link the user's tank 106 and subsequent measurement values relating to the tank to the stored values. The user configured values may only be used by the user or may be shared between different users. This may increase data within database to provide a full data set. That is, some or all of the data stored in database may be shared among users. The computing device 102 may receive initial values such as tank type, fuel type, cooking apparatus type, and so on.

Computing device 102 may include control logic to configure the processor to correlate the measurement values to the data values stored in a database to determine an amount of fuel in the fuel tank 106. For example, the measurement values may define a current weight for the tank 106 and fuel therein. The measurement value(s) may be correlated to values for an empty tank 106 (e.g. default, average, user configured) for the particular tank type, average weight for fuel for the particular fuel type, values for a full tank 106 e.g. default, average, user configured) for that tank type, and so on. Computing device 102 may be configured to determine the amount of fuel in the fuel tank 106 using the values stored in the database. It may be an estimate or average amount of fuel or a precise amount.

In accordance with some embodiments, the processor of the computing device 102 is further configured to determine a time value using the amount of fuel in the propane tank 106. The time value provides an estimate of how long the propane tank 106 can provide fuel to the cooking apparatus 110. The time value may be computed using values stored in database for the type of cooking apparatus 110, such as average fuel usage and so on.

Computing device 102 may include control logic to configure the processor to provide the amount of fuel in the propane tank to a user interface 104. The user interface 104 provides an indication of the amount of fuel in the propane tank 106. FIGS. 14 to 18 illustrates example user interfaces 104 for computing devices according to embodiments described herein.

Figure 14:
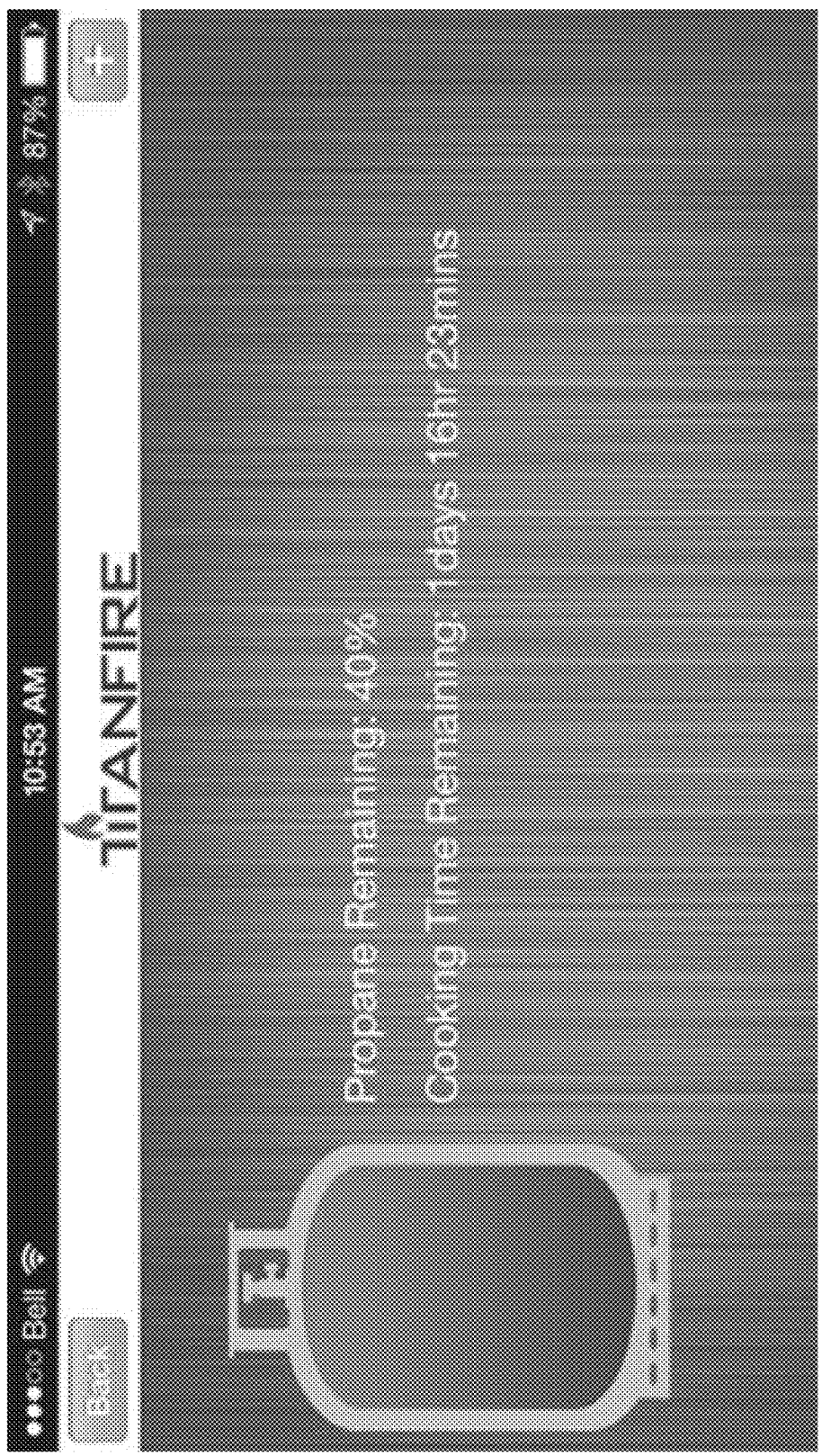
FIGS. 14 to 18 illustrates example user interfaces for computing devices according to embodiments described herein.
Figure 15:
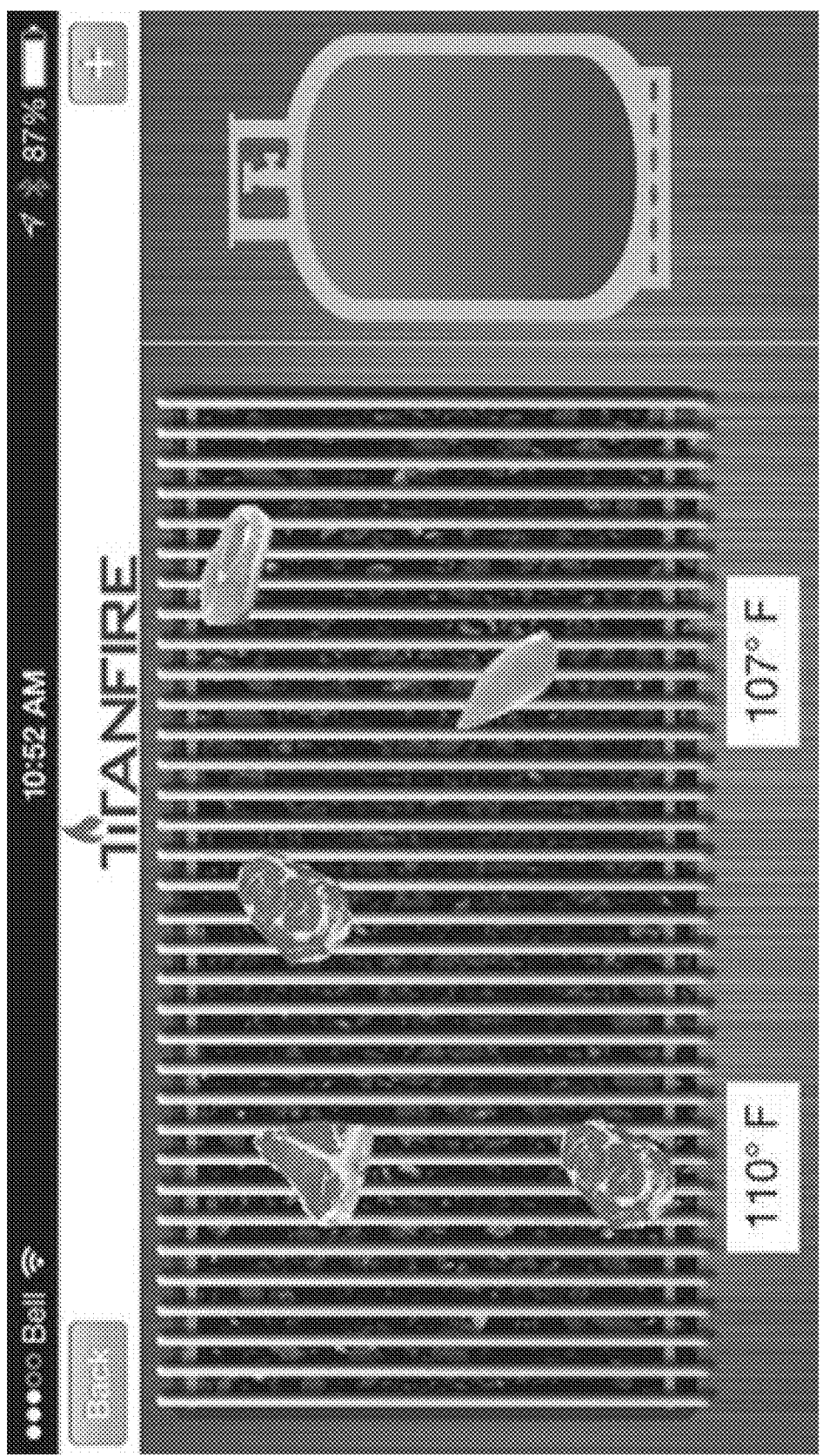

FIG. 14 illustrates an example user interfaces 104 providing an indication of the amount of fuel in the propane tank 106 as a percentage value. The example user interfaces 104 providing an indication of time value to provide an estimate of how long the fuel tank 106 can provide fuel to the cooking apparatus 110. This example provides the time value in days, hours, and minutes. FIG. 15 illustrate an example user interfaces 104 providing an indication of the amount of fuel in the propane tank 106 as shading of an image of the fuel tank 106.

Figure 16:
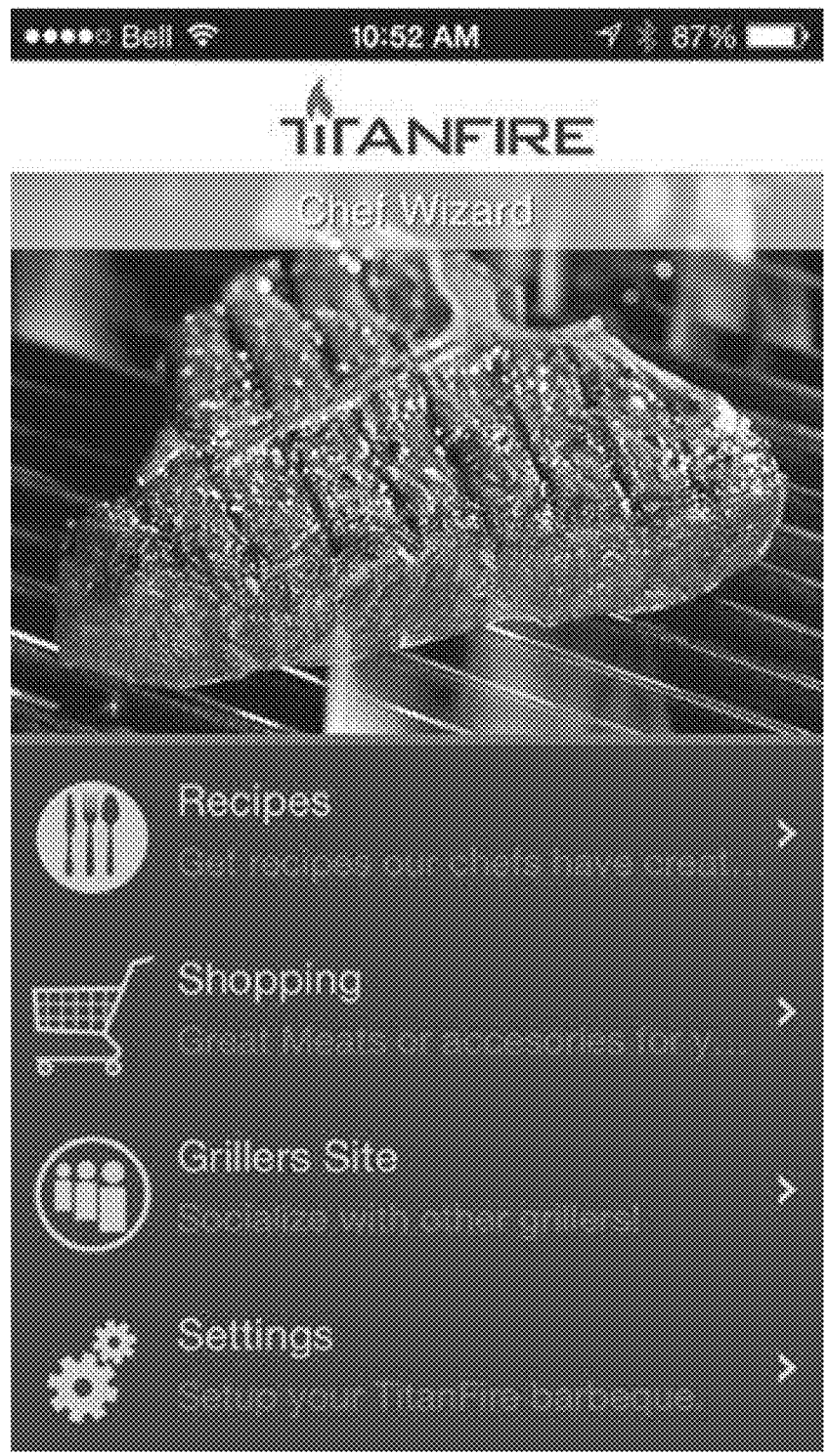

FIG. 16 illustrates an example user interfaces 104 providing a menu option to select recipes, shopping guides, griller sites, and settings. The recipes may be configured based on weight measurement values as described herein.

Figure 17:
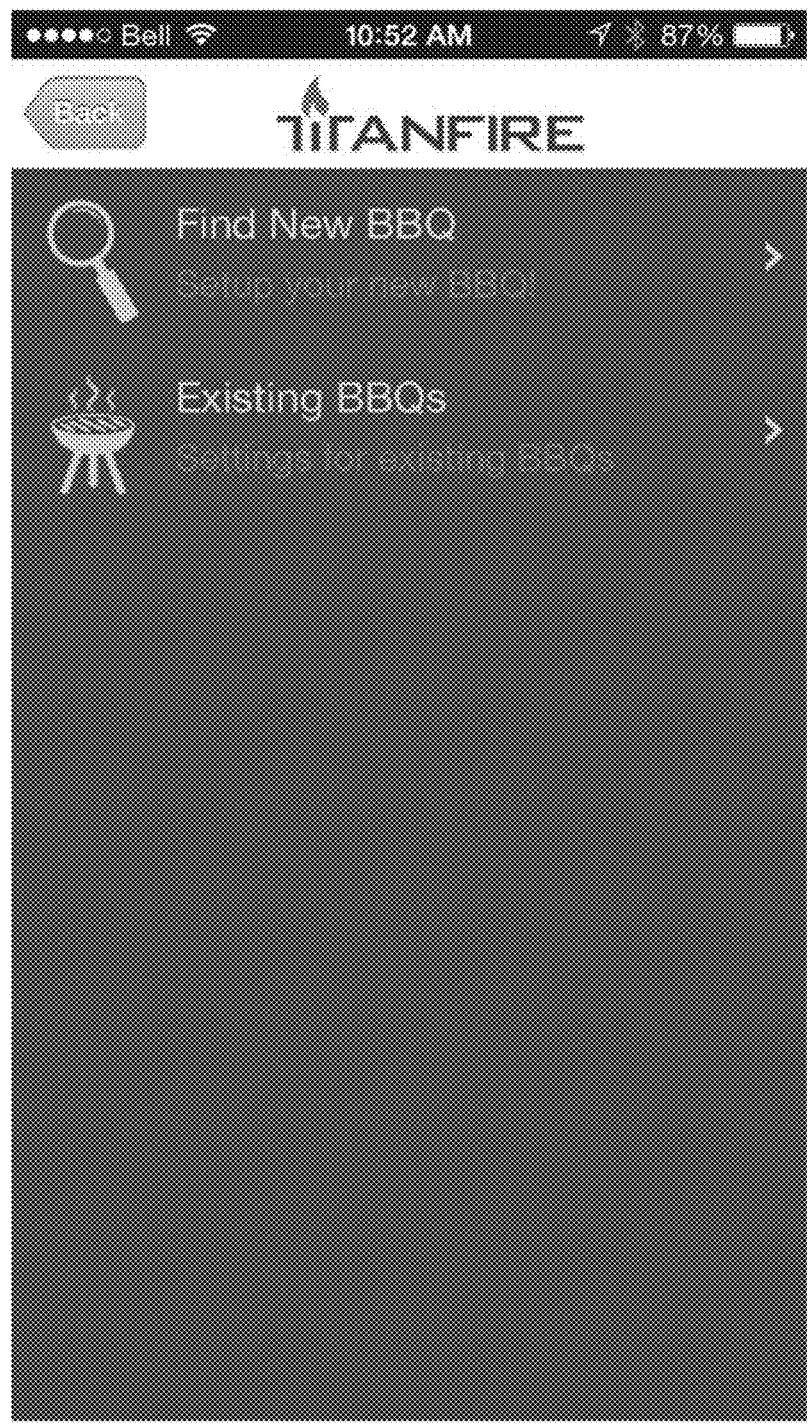
Figure 18:
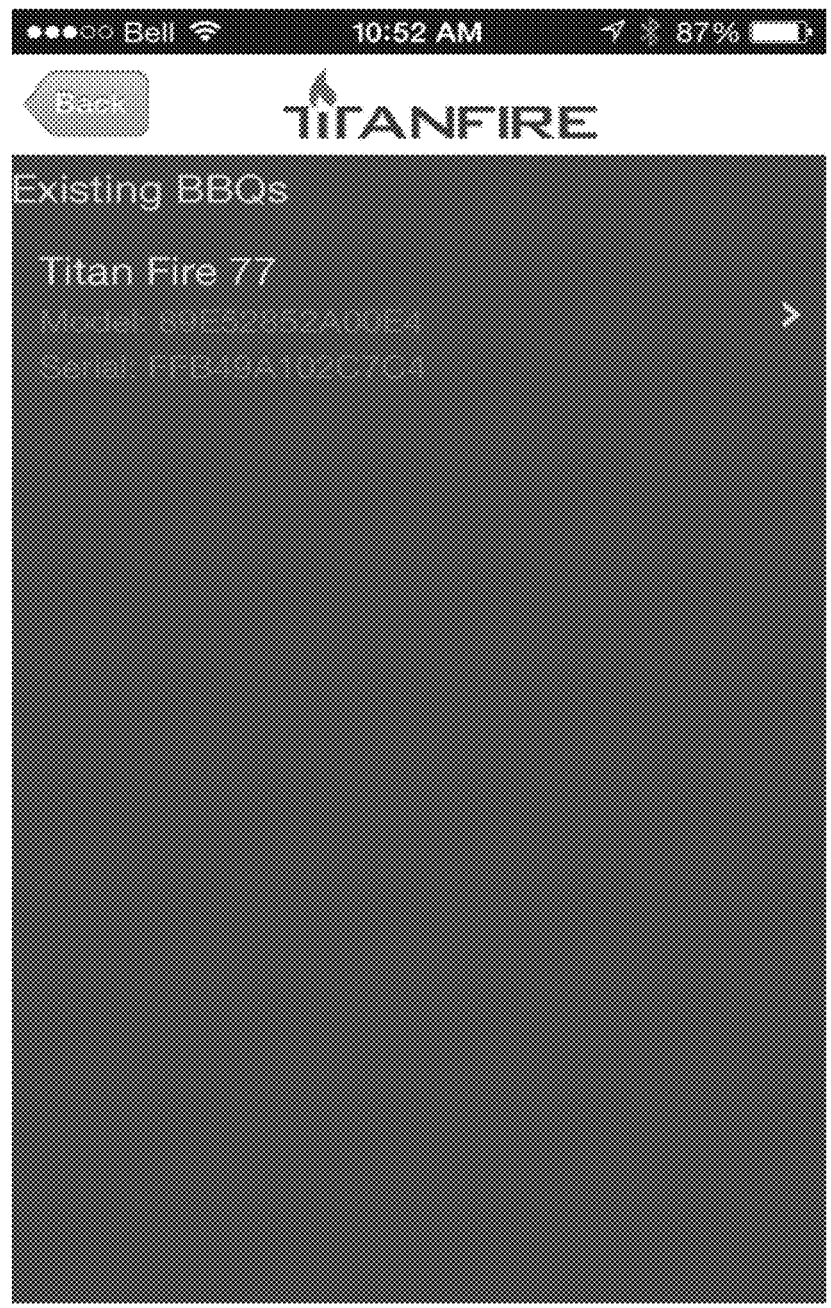

FIG. 17 illustrates an example user interfaces 104 providing a menu option for cooking apparatus 110 types. The computing device 102 may be configured to access a library of options for cooking apparatus 110 types, which may also be user configured. The cooking apparatus 110 types may be used to determine a subset of data values particular to the cooking apparatus 110 type to in turn generate output data values, such as an indication of time value to provide an estimate of how long the fuel tank 106 can provide fuel to the cooking apparatus 110. FIG. 18 illustrates an example user interfaces 104 providing an cooking apparatus 110 type for the current cooking apparatus 110 the fuel measurements relate to.

FIGS. 2 to 5 illustrate a schematic diagram of other example systems for remote fuel level detection according to embodiments described herein.

In accordance with some embodiments, the system may further comprise a temperature instrument 112 for determining various temperature measurements.

Figure 2:
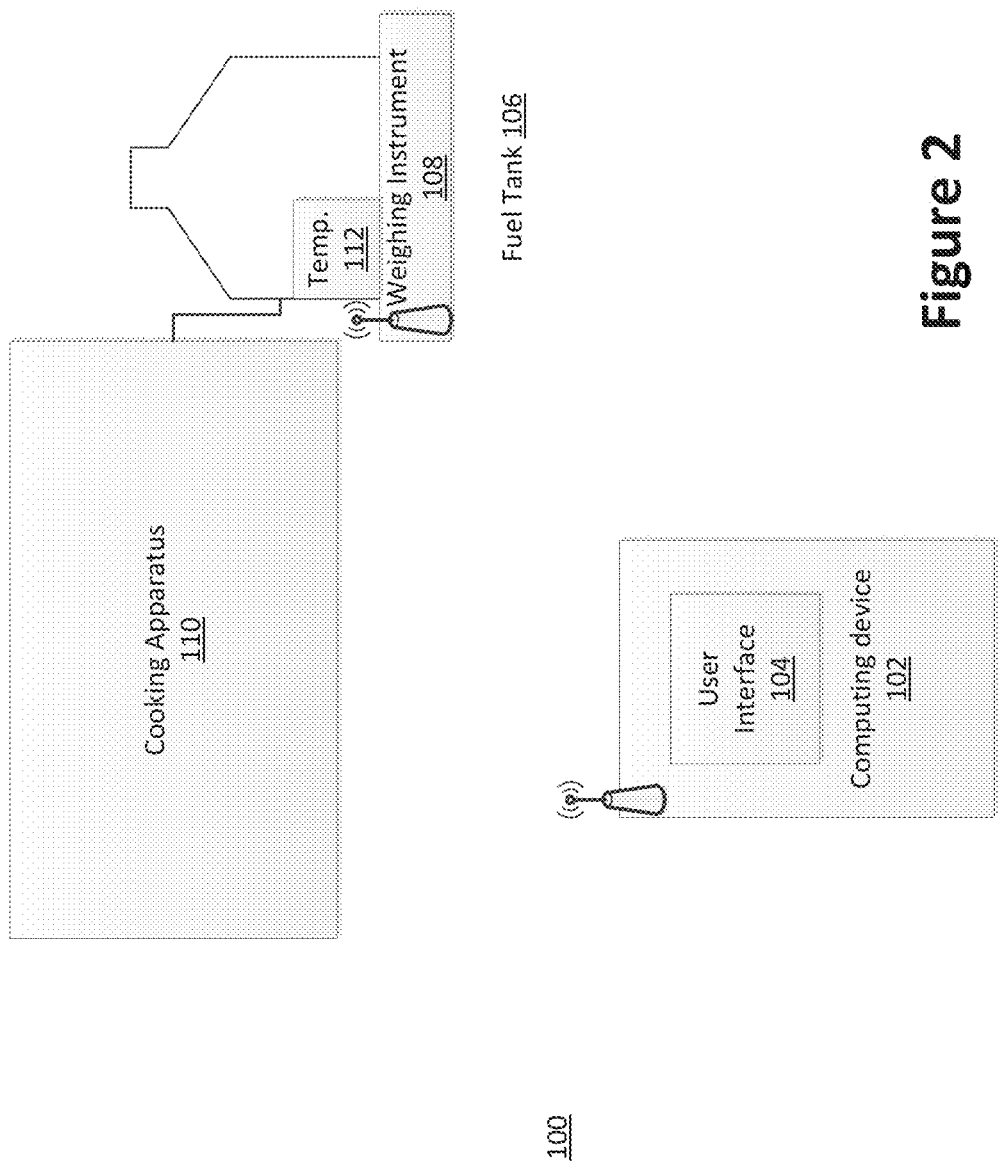
FIG. 2 illustrates a schematic diagram of another system for remote fuel level detection according to embodiments described herein.

As shown in FIG. 2, a temperature instrument 112 may be configured and positioned for determining various temperatures measurements of a region proximate to the fuel tank 116. The processor of the computing device 102 may be further configured to receive, via a wireless communication link from the temperature instrument 112, temperature measurements of the region proximate to the propane tank.

The computing device 102 may be further configured to correlate the temperature of the region proximate to the propane tank to safety threshold data values stored in a database to generate a safety data value. The safety threshold values may indicate safe temperature ranges and dangerous or risk related temperature ranges, which may increase the likelihood of a fire or other incident relating to the fuel tank 106. Computing device 102 may be further configured to provide the safety data value to the user interface 104. The user interface may then provide an indication of the safety data value for the propane tank. This may be an alert notification with a sound or other alarm to prompt the attention of the user that a hazard relating to the fuel tank 106 may be likely.

The safety data may alert for propane safety issues detected remotely and provide guides (e.g. via user interface 104) for fire prevention, leak detection, and so on.

The safety data may relate to both weight measurements and temperature measurements. A full fuel tank 106 at a high temperature may have an increased likelihood of fire or increase damage associated with any fire, than a near empty tank for example. The safety data may also relate to degradation of hose at high temperatures, clean grills, holes in burners, and so on. More fuel in tank at higher temperatures may increase concern and provide an alert for user.

Computing device 102 may be configured to provide instructions on how to properly check propane tank tanks for leaks when it is installed. Computing device 102 may indicate whether a tank 106 has been replaced and may instruct the user how to properly check tank 106 via instructions, video (visual for potentially foreigners or non-English/French/Spanish).

Computing device 102 may detect a dangerous situation (e.g. cooking fire, propane fire) and remotely and automatically notify emergency services.

Computing device 102 may be configured to generate alerts and warnings when receiving data indicating any potential unsafe issues. The alert may also be recorded in a server database as log for the user and cooking apparatus manufacturers, CPSC, governmental safety agencies, insurance companies, etc. 15. Extended usage could also push data to companies for servicing if persistent issues exist. Manufacturers of similar apparatuses may also be informed of these instances.

Computing device 102 may also interface with residential or commercial propane re-fillers to automatically schedule re-fill request using actual measurements. Real-time updates may enable the re-filler to estimate and schedule re-fills (e.g. degree days, prior history).

Figure 3:
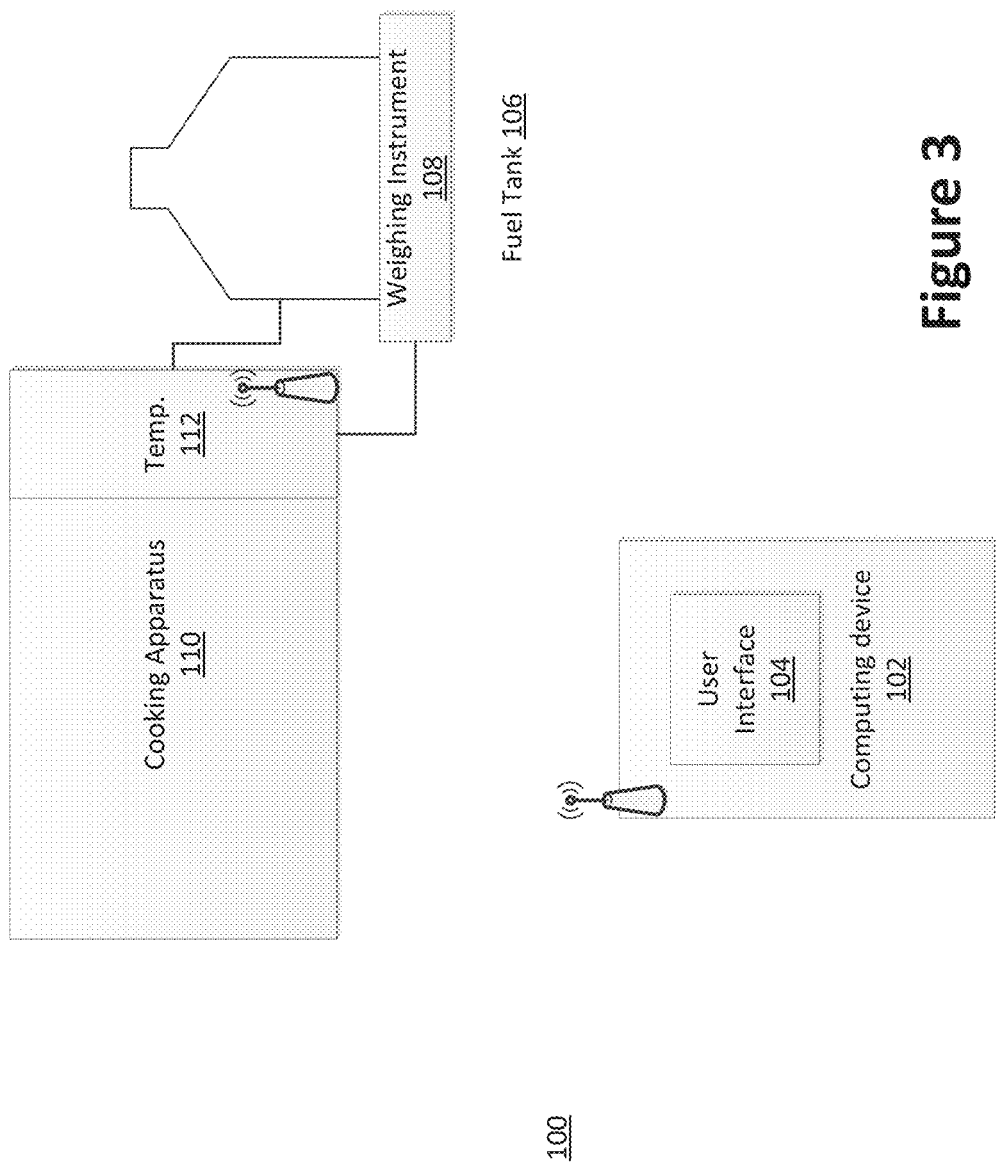
FIG. 3 illustrates a schematic diagram of a further system for remote fuel level detection according to embodiments described herein.
Figure 4:
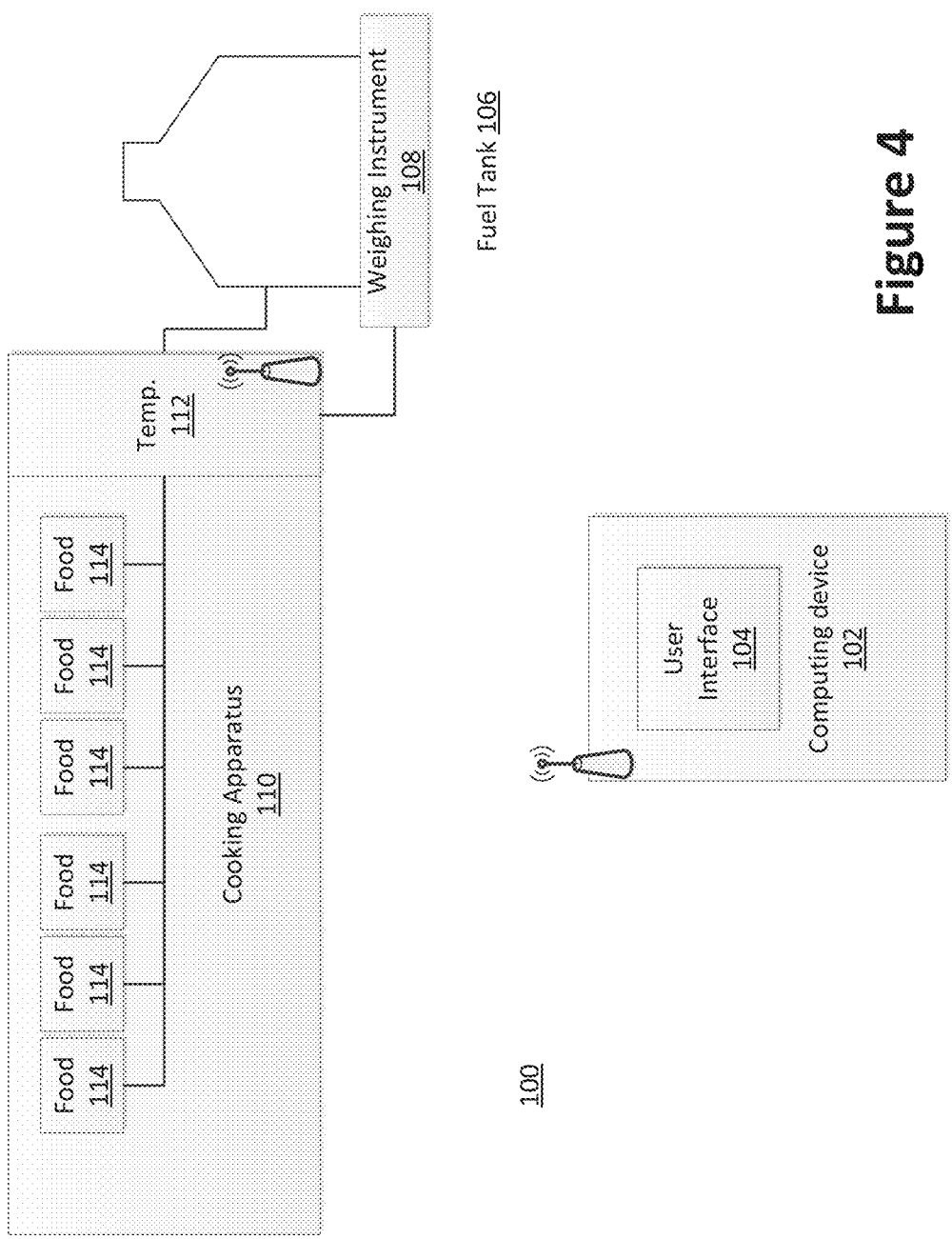
FIG. 4 illustrates a schematic diagram of another system for remote fuel level detection according to embodiments described herein.
Figure 5:
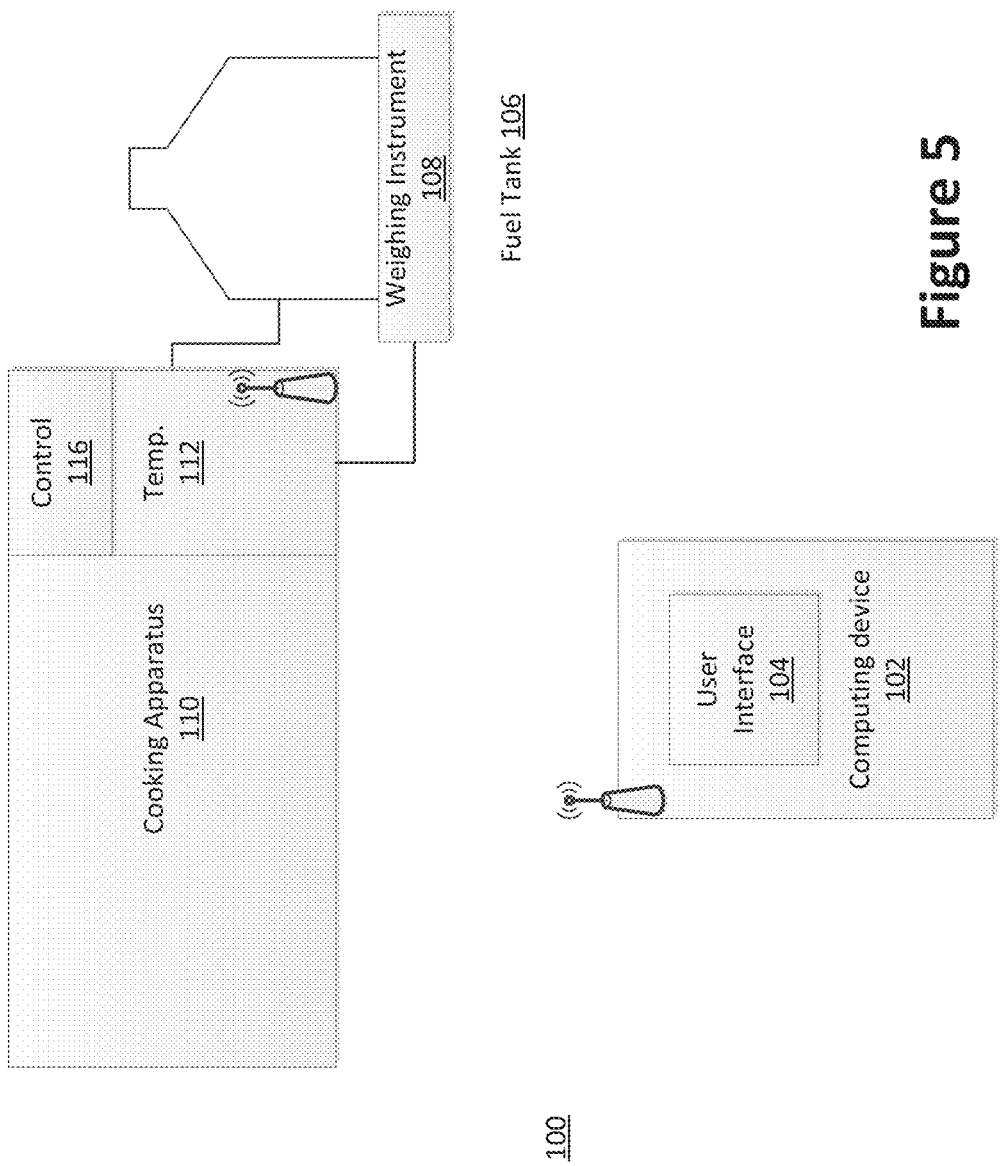
FIG. 5 illustrates a schematic diagram of a further system for remote fuel level detection according to embodiments described herein.

As shown in FIG. 3, a temperature instrument 112 may be configured and positioned for determining temperatures for regions proximate to the cooking apparatus 110. This may provide an indication of the temperature of the grill or other surface of the cooking apparatus, and regions thereof. For example, one side of the grill may be a different temperature than the other side of the grill to cook different types of food items at different temperatures. The regions may generally correspond to different food items located therein. The temperature instrument 112 may have multiple probes or attachments for reading temperature data for the different regions.

The temperature instrument 112 may also be used to detect humidity for baking applications. Probes may be humidity sensing. Probes may also incorporate inside resistant elements detection or gas detection.

The processor of the computing device 102 may be further configured to receive, via a wireless communication link from the temperature instrument 112, the temperatures for the regions proximate to the cooking apparatus. The processor of the computing device 102 may be further configured to correlate the temperatures for the regions proximate to the cooking apparatus to food items cooking on the cooking apparatus in those regions. The user may input data regarding the type and position of various food items relative to the grill or regions of the cooking apparatus 110. This may be used to generate a cooking factor (e.g. undercooked, rare, medium, well done, and so on) for each of the food items. The processor of the computing device 102 may be further configured to correlate the temperatures for the regions proximate to the cooking apparatus to a desired temperatures set by the user so that if the detected temperature falls outside the desired temperature range (e.g. above or below) an alert may be provided to the user. This may assist the user in monitoring the cooking process remotely.

The processor of the computing device 102 may be further configured to provide the cooking factors, warnings, notifications or other data relating to the temperatures to the user interface 104. The user interface provides an indication of the cooking factors for the food items cooking on the cooking apparatus, or an indication of warnings, notifications or other data relating to the temperatures.

The temperature instrument 112 may be further configured for determining temperatures for food items cooking on the cooking apparatus. The temperature instrument 112 may couple with multiple probes or other mechanisms for inserting or connecting to food items to monitor temperatures thereof. That is, each probe may couple to a food item cooking on the cooking apparatus. The processor of the computing device 104 may be further configured to receive, via a wireless communication link from the temperature instrument 112, the temperatures for the food items cooking on the cooking apparatus, correlate the temperatures for food items cooking on the cooking apparatus to cooking factors (e.g. undercooked, rare, medium, well done, and so on) for each of the food items, and provide the cooking factors to the user interface 104. The user interface 104 provides an indication of the cooking factors for the food items cooking on the cooking apparatus 110.

As shown in FIG. 15, the user interface 104 may provide a diagram of various food items positioned on the grill of the cooking apparatus 110, along with temperature measurements of two sides or regions of the grill of the cooking apparatus 110. In some examples, the user interface 104 may provide an indication of a cooking factor (e.g. undercooked, rare, medium, well done, and so on) for each food item.

Warnings could also be given at temperatures where burning could cause charred food and possible carcinogens.

FIGS. 8 to 13 illustrate a schematic diagram of different views of a temperature device 112 according to embodiments described herein. The temperature device 112 may include thermocouple inputs for receiving measurement data from probes (this example shows four on each side) or other mechanisms. The temperature device 112 may include thermocouple inputs for receiving data for the region proximate to the fuel tank 106, and for different regions of the cooking apparatus 110. The temperature device 112 may include a wireless communication link such as Bluetooth or other wireless protocol to communicate with other components of system 100. The temperature device 112 may include wired communication links for directly coupling to components of system 100. The temperature device 112 may include a power on/off switch and a battery or power store.

Figure 19:
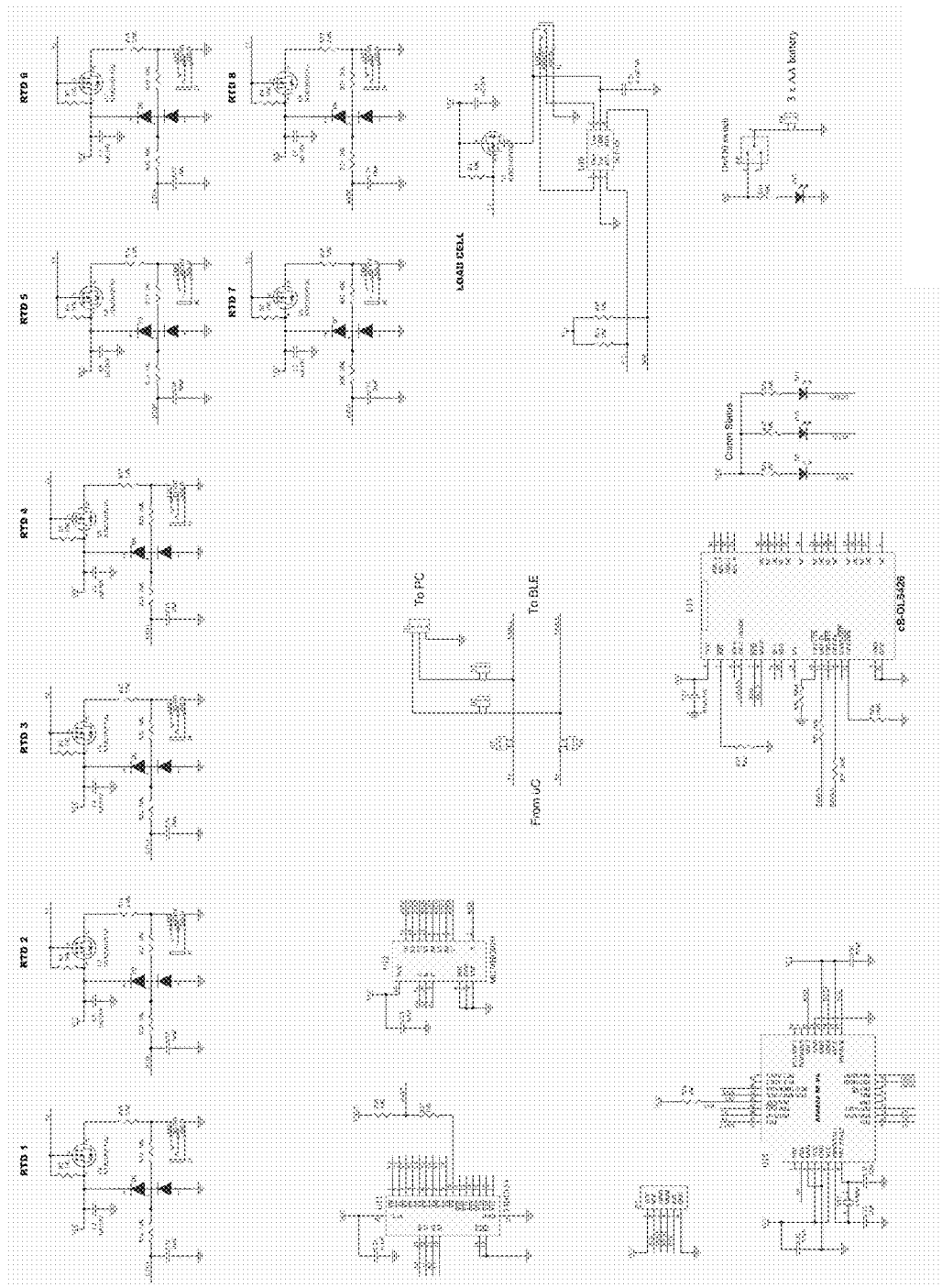
Figure 20:
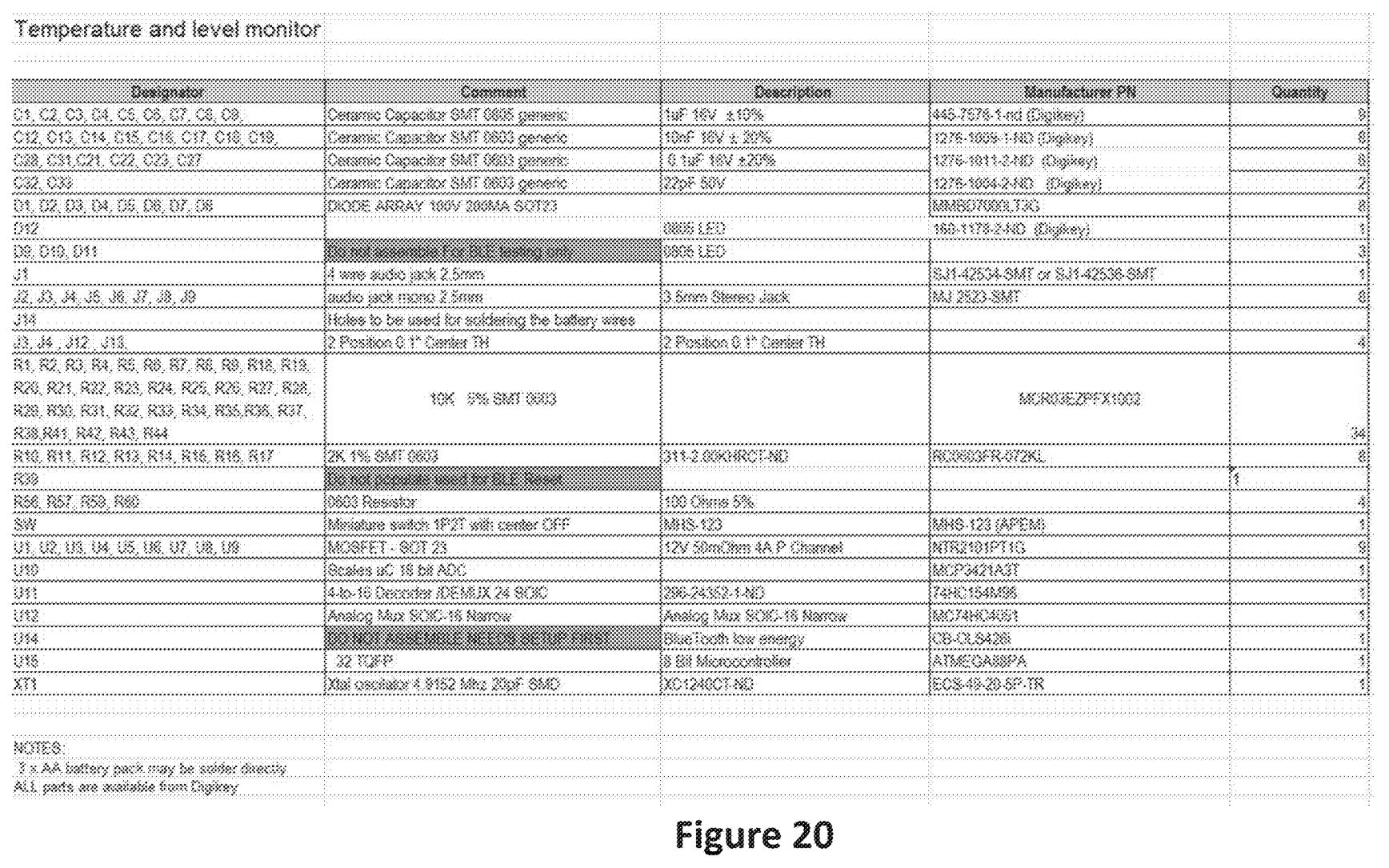

FIGS. 19 and 20 illustrate a schematic diagram and table for an electronic layout of a fuel level detection and temperature device 112 according to embodiments described herein.

In accordance with some embodiments, the system 100 may further comprise a temperature control 116 (FIG. 5) for controlling the cooking apparatus 110 in response to control signals received from the computing device 102 via the wireless communication link. For example, the temperature control 116 may be used to turn the temperature of the cooking apparatus 110 up or down. This may enable the user to remotely control the cooking process to facilitate cooking and reduce direct monitoring by the user.

In accordance with some embodiments, the system 100 may further comprise a grill plate coupled to a thermocouple (which may be part of or coupled to the temperature device 112) to determine a temperature for the grill plate. The grill plate may be used to provide a barbeque with oven cooking qualities. The processor of the computing device 102 is further configured to receive, via a wireless communication link, the temperature for the grill plate, and correlate the temperature for the grill plate to data values stored in a database to generate a cooking factor for the grill plate (e.g. temperature or range), and provide the cooking factor for the grill plate to the user interface 104. The user interface 104 provides an indication of the cooking factors for the grill plate. Example grill plates as provided in U.S. D594276 and D604098 which may allow baking capability on a grill. The system 100 provides measurements to monitor and control temperature.

In another aspect embodiments described herein, the system 100 for remote fuel level detection may include a weighing instrument 108 for determining measurement values for a weight of one or more objects. The objects may be food items for example. The computing device 102 may correlate the measurement values for the food items to data values stored in a database to generate output data values. The output data may include nutritional information about the food item, which may be adapted to the weight measurement value for the food item. The user interface 104 may provide an indication of the output data values (e.g. the nutritional information). In accordance with some embodiments, the weighing instrument 108 may be a kitchen scale, food scale, ingredient scale, or other weigh scale device.

The system 100 may also detect temperatures for the food items, such as melted chocolate, syrup, and so on. In accordance with some embodiments, the system 100 may further comprise a temperature instrument 112 for determining a temperature of the one or more food items. This may be used in conjunction with the weight metric to determine desired cooking factors for the food items. In accordance with some embodiments, the processor of the computing device is further configured to provide a video cooking demonstration for the food items. That is, system 100 may monitor cooking via temperature and provide videos to assist user in cooking at that time.

The system 100 may also be used in restaurants for order processing and food monitoring. For example, a customer may order a meat portion to be cooked to a particular cooking level (e.g. rare). The system 100 can track order and monitor cooking.

In accordance with some embodiments, the data values stored in the database correspond to data values for a cooking recipe listing ingredients and corresponding weight measurements. The measurement value for one food item in the listing may then trigger adjustment of the other weight measurements for the other food items to adapt the recipe to the current amount of a given food item. That is, the recipe may dynamically adjust based on the measurement values for food items.

In a further aspect embodiments described herein may provide a method for remote fuel level detection.

The method may involve providing a weighing instrument 108 for coupling to a fuel tank 106 coupled to a cooking apparatus 110 to provide the fuel to the cooking apparatus.

The method may involve determining measurement values for a weight of the fuel tank 106 using the weighing instrument 108.

The method may involve providing executable instructions to a computing device 102 (e.g. an application download or stream) to configure the device 102.

The method may involve receiving, via a wireless communication link at the computing device 102, the measurement values for the weight of the propane tank, and correlating the measurement values to data values stored in a database to determine an amount of fuel in the propane tank 106.

The method may involve providing the amount of fuel in the propane tank 106 to a user interface 104, where the user interface 104 provides an indication of the amount of fuel in the propane tank 106.

In accordance with some embodiments, the method may further involve providing a temperature instrument 112 for determining temperature measurements for various components of the system 110 as described herein.

In accordance with some embodiments, the method may further comprise determining a time value using the amount of fuel in the propane tank. As described, the time value provides an estimate of how long the propane tank can provide fuel to the cooking apparatus.

Embodiments described herein relate to systems, methods, and devices for remote fuel level detection. A weighing instrument 108 may couple to a fuel tank 106 for determining measurement values for a weight of the fuel tank 106. A computing device 102 may receive, via a wireless communication link, measurement values for the weight of the tank 106 to correlate the measurement values to data values stored in a database to determine an amount of fuel in the propane tank 106, and provide the amount of fuel in the propane tank to a user interface 104. A temperature instrument 112 may determine a temperature of a region proximate to the propane tank to generate a safety factor for the propane tank, or regions proximate to the cooking apparatus, or for food items cooking on the cooking apparatus using probes coupled to a food items, or regions, or other components. A temperature control 116 may control the cooking apparatus.

These are illustrative examples and other variations of the system 100 may enable for remote detection, measurement and control.

The control may be a Wi-Fi based control using alternate formats from Wi-Fi, Bluetooth, Zigbee, Atmel, STM or TI to communicate directly to individual components such as gas grills, gas fire pits, speakers systems, outdoor lighting, hot-tubs, swimming pools, sprinkler systems, fuel tanks (propane or oil), televisions or other outdoor devices.

This control may then allow the user through a smartphone (iPhone, android, etc.) or an tablets (iPad, galaxy, Microsoft device) to control and communicate directly with appliances (e.g. outdoor cooking apparatuses 110 and so on).

These features could be combined or independent depending on customer preference. In addition gas grill module may be retrofit to be assembled onto existing gas grills, to allow users to have this control.

Example features include: RFID tag or some other method and a serial number may be put in at factory level on device. The device 102 may collect and access data and implement actions regarding different products (e.g. apparatus 110) such as displays, model number, Serial number, Warranty information, Confirmation that customer has read and understands manual with box to check off, Register product, and provide updates to customer on regular basis, Recall notices, and important seasonal maintenance.

The temperature instrument 112 may couple to temperature probes. There may be multiple probes as per cook genius (e.g. 4, 6, or more). The user may configure the device 102 or database to store favourites, different meats, and favourite meals option. The temperature probe may couple to or be proximate to a grill to provide diagnostics on grill, current ambient temperature, multiple zone temperatures, and so on.

The weigh instrument 108 may be used to determine propane level and level in tank by weight, time remaining, provide an alert when low, call up last level if prompted remotely, closest propane re-filler location, delivery service option, and so on.

The device 102 may be configured with a timer function to provide a countdown timer and alarms by beeper or visual indication on app.

The device 102 may be configured with a music function to remotely control music applications and services and stream music through device 102, to remotely control speaker volume (standard controls).

The device 102 may be configured with an outdoor lighting function to control lighting, on and off, dimmer controls, and a timer feature.

The device 102 may be configured with a warning function to provide regular maintenance, leak checks, flame blowout, and other safety warnings.

The device 102 may be configured with an advertising function to provide advertising functionality for barbeque features (propane re-fillers, gas grill service companies, meat suppliers, mass merchant advertising, theme advertising (father's day, super bowl, etc.), music (music advertising), special event advertising (rib festivals, community events), grocery stores (specials, locations, targeted marketing to gas grill owners), pools (chemical supplies, service companies), hot tubs (chemical supplies, service companies), fire pits (accessories, service companies), lighting (landscape companies, garden supplies, service companies), fuel companies (monitor usage, service and repeat service), security (remote monitoring services, service), recipe companies (grill recipes), mail order meats and spices (linked connection for ordering). Various components noted may be remotely controlled and monitored using system 100.

The device 102 may be configured with a gas grill control 116 to control temperature and set points (1 or 2 zones), provide a remote start option through smartphone and so on.

The device 102 may be configured with a fire pit control to control flame height and provide a remote start option through smartphone.

The device 102 may be configured to indicate remotely measured fuel tank levels. This feature may allow the consumer to measure usage and levels, and fuel suppliers may also be given access to check levels and properly route plan their trucks for refuel services. Alarms may be given if levels reached too low and emails could be provided to allow customer to order on line or notify re-filler to refuel tank, and service options could also be tied in.

The device 102 may be configured with safety features to provide notice if any dangerous situation arose. For example, gas grill fire, hot tub malfunction in winter, propane leak, or security feature tripped. Customer could then respond appropriately to issue more quickly, through features on application.

The device 102 may be configured with other features such as a party organizer (social media interfaces), location tracker (allow mass merchants to see which appliances were sold depending on location and allow for better ordering accuracy in future), customer service interface, "how to" video demonstrations, start cooking function, inside cooking control, bar cooler setter, meal planner, pool feature (ph., temp, etc.), hot tub feature (ph., temp, etc.), video control (security feature). integrate with security based systems, island features (fridge, warming drawer, pizza oven), store locater, retrofit locater, and so on.

The scope of the claims should not be limited by the described embodiments and examples but should be given the broadest interpretation consistent with the description as a whole.

The invention claimed is:

1. A system for remote fuel level detection comprising:
   a weighing instrument for coupling to a propane tank for determining measurement values for a weight of the propane tank, wherein the propane tank is for coupling to a cooking apparatus to provide the fuel to the cooking apparatus, the weighing instrument further comprising a kitchen scale for determining measurement values for a weight of one or more food items;
   a computing device comprising at least one processor and at least one memory storing executable instructions to configure the at least one processor to:
   receive, via a wireless communication link, the measurement values for the weight of the propane tank;
   correlate the measurement values to data values stored in a database to determine an amount of fuel in the propane tank and output data values corresponding to a weight of the one or more food items; and
   provide the amount of fuel in the propane tank to a user interface, wherein the user interface provides an indication of the amount of fuel in the propane tank and the output data values.

2. The system of claim 1, further comprising:
   a temperature instrument for determining a temperature of a region proximate to the propane tank;
   wherein the processor of the computing device is further configured to:
   receive, via a wireless communication link from the temperature instrument, the temperature of the region proximate to the propane tank;
   correlate the temperature of the region proximate to the propane tank to safety threshold data values stored in a database to generate a safety data value;
   provide the safety data value to the user interface, wherein the user interface provides an indication of the safety data value for the propane tank.

3. The system of claim 1, further comprising:
   a temperature instrument for determining a plurality of temperatures for a corresponding plurality of regions proximate to the cooking apparatus;
   wherein the processor of the computing device is further configured to:
   receive, via a wireless communication link from the temperature instrument, the plurality of temperatures for the corresponding plurality of regions proximate to the cooking apparatus;
   correlate the plurality of temperatures for the corresponding plurality of regions proximate to the cooking apparatus to a corresponding plurality of food items cooking on the cooking apparatus to generate a cooking factor for each of the plurality of food items;
   provide the cooking factors to the user interface, wherein the user interface provides an indication of the cooking factors for the plurality of food items cooking on the cooking apparatus.

4. The system of claim 3, further comprising:
   a temperature control for controlling the cooking apparatus in response to control signals received from the computing device via the wireless communication link.

5. The system of claim 1, further comprising:
   a temperature instrument for determining a plurality of temperatures for a corresponding plurality food items cooking on the cooking apparatus, wherein the temperature instrument comprises a plurality of probes, each probe coupled to a food item of the plurality food items cooking on the cooking apparatus;
   wherein the processor of the computing device is further configured to:
   receive, via a wireless communication link from the temperature instrument, the plurality of temperatures for the plurality food items cooking on the cooking apparatus;
   correlate the plurality of temperatures for the plurality food items cooking on the cooking apparatus to a corresponding plurality of cooking factors for each of the plurality of food items;
   provide the cooking factors to the user interface, wherein the user interface provides an indication of the cooking factors for the plurality of food items cooking on the cooking apparatus.

6. The system of claim 1, wherein the processor of the computing device is further configured to determine a time value using the amount of fuel in the propane tank, wherein the time value provides an estimate of how long the propane tank can provide fuel to the cooking apparatus.

7. The system of claim 1, further comprising:
   (a) a grill plate coupled to a thermocouple to determine a temperature for the grill plate;
   (b) wherein the processor of the computing device is further configured to:
   (i) receive, via a wireless communication link, the temperature for the grill plate;

(ii) correlate the temperature for the grill plate to data values stored in a database to generate a cooking factor for the grill plate;

(iii) provide the cooking factor for the grill plate to the user interface, wherein the user interface provides an indication of the cooking factors for the grill plate.

8. The system of claim 1, wherein the wireless communication link comprises a Bluetooth communication link.

9. A system comprising:
a weighing instrument for determining measurement values for a weight of one or more objects, the weighing instrument comprising a kitchen scale the one or more objects corresponding to food items;
a computing device comprising at least one processor and at least one memory storing executable instructions to configure the at least one processor to:
receive, via a wireless communication link from the weighing instrument, the measurement values for the weight of the one or more objects;
correlate the measurement values to data values stored in a database to generate output data values, the output data values corresponding to a weight of the food items; and
provide the output data values to a user interface, wherein the user interface provides an indication of the output data values.

10. The system of claim 9, further comprising:
a temperature instrument for determining a temperature of the one or more food items;
wherein the processor of the computing device is further configured to:
receive, via a wireless communication link from the temperature instrument, the temperature of the one or more food items;
correlate the temperature of the one or more food items to cooking threshold data values stored in a database to generate a cooking factor for the one or more food items;
provide the cooking factor to the user interface, wherein the user interface provides an indication of the cooking factor for the one or more food items.

11. The system of claim 9, wherein the processor of the computing device is further configured to provide a video cooking demonstration for the one or more food items.

12. A system comprising:
a weighing instrument for determining measurement values for a weight of one or more objects;
a computing device comprising at least one processor and at least one memory storing executable instructions to configure the at least one processor to:
receive, via a wireless communication link from the weighing instrument, the measurement values for the weight of the one or more objects;
correlate the measurement values to data values stored in a database to generate output data values; and
provide the output data values to a user interface, wherein the user interface provides an indication of the output data values,
wherein the data values stored in the database correspond to data values for a cooking recipe listing a plurality of ingredients and a corresponding plurality of weight measurements, wherein the one or more objects correspond to an ingredient of the plurality of ingredients, and wherein the processor of the computing device is further configured to adjust the corresponding plurality of weight measurements based on the measurements values for the ingredient, and wherein the output data values provide an indication of the adjusted corresponding plurality of weight measurements.

\* \* \* \* \*